Patented July 1, 1930

1,769,423

UNITED STATES PATENT OFFICE

ROBERT EDER, OF ZURICH, SWITZERLAND, ASSIGNOR TO SOCIETY OF CHEMICAL INDUSTRY IN BASLE, OF BASEL, SWITZERLAND

SULFIDES OF AROMATIC COMPOUNDS AND PROCESS OF MAKING SAME

No Drawing. Application filed May 17, 1928, Serial No. 278,643, and in Switzerland May 27, 1927.

The present invention relates to polysulfides of aromatic compounds containing at least one free or esterified carboxylic group, and it comprises the process of making these compounds, as well as the new compounds themselves.

Hitherto only the mono- and disulfides of aromatic carboxylic acids have been known. It is true that Hinsberg (Berichte 1910, vol. 43, page 1874) refers incidentally to a compound which he regarded as free trithiosalicylic acid on account of its production by boiling a thioanhydride of trithiosalicylic acid with caustic soda solution of 10 per cent strength. However, in view of the high degree of instability of the polysulfides, particularly those of the aromatic carboxylic acids, towards alkalies, it is very unlikely that Hinsberg really produced this acid.

The present invention is based on the observation that the aromatic mercapto-carboxylic acids and their esters of the formula

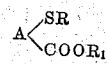

wherein $A$ = aryl, $R$ = H or its equivalent of a metal, $R_1$ = H or a monovalent hydrocarbon radical, react easily and smoothly with sulfur halides with substitution of the hydrogen of the sulfhydryl-group by sulfur and union of two carboxylic acid molecules, the entering sulfur constituting the connecting bridge, the resulting products having the formula

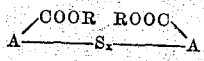

($A$ = aryl, $R$ = H or a monovalent hydrocarbon radical, $x$ = a whole number higher than two). With sulfur halides of the general formula $S Hal_2$ trisulfides are produced, while with those of the general formula $S_2 Hal_2$ tetrasulfides are produced.

For example, from 2-mercaptobenzoic acid there is produced by action of $SCl_2$ the dibenzoic acid-2:2'-trisulfide, and by the action of $S_2Cl_2$ the dibenzoic acid-2:2'-tetrasulfide:

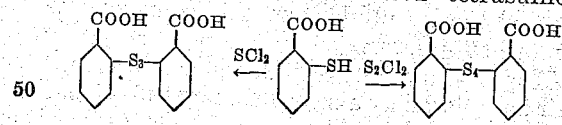

In like manner, when starting from an ester of the mercapto-acid a corresponding dicarboxylic acid-estertrisulfide and dicarboxylic acid-estertetrasulfide are obtained. These compounds can also be obtained from the dicarboxylic acid-polysulfides by the usual esterification methods:

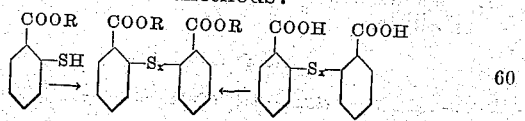

Instead of mercaptobenzoic acid itself a substitution product thereof may be used, such as mercapto-hydroxybenzoic acid. In this manner polysulfides of salicylic acid and acetyl-salicylic acid may be obtained, for example.

The sulfur halides are preferably allowed to act in presence of an indifferent organic solvent, such as ether, chloroform, acetone, methylene chloride or petroleum ether.

Instead of the free mercaptans, metal compounds thereof, such as alkali mercaptides, may be used.

The free polysulfide carboxylic acids may be converted, in the known manner, by treatment with alcoholic alkali or alkaline earths, or with alkali alcoholate, or alkaline earth alcoholate, into their alkali or alkaline earth salts which are soluble in water with some separation of sulfur; in this reaction it is best to avoid aqueous alkali with care.

The new compounds are useful for therapeutical and technical purposes.

The following examples illustrate the invention, the parts being by weight:—

EXAMPLE 1

*Di-benzoic acid-3:3'-polysulfides*

(a). *Trisulfide.*—10 parts of 3-mercaptobenzoic acid (melting point 146–147° C) are dissolved in a little ether and into the cooled solution there is dropped gradually about 3.5 parts of sulfur dichloride dissolved in petroleum ether. The trisulfide thus produced separates in larger part and the separation is completed by adding petroleum ether and cooling. The solid matter is filtered and washed with petroleum ether and dried.

After recrystallization from hot alcohol the dibenzoic acid-3:3′-trisulfide is obtained in the form of green-yellowish crystalline needles of melting point 203° C. It dissolves very easily in hot methyl alcohol, ethyl alcohol, amyl alcohol or glacial acetic acid. It is somewhat soluble in ether but very slightly soluble in chloroform, benzene or xylene. In sodium carbonate or bicarbonate solution and in ammonia solution it dissolves first to a clear solution, which quickly becomes turbid owing to separation of sulfur.

(b). *Tetrasulfide.*—5 parts of sulfur monochloride are dropped into a cool etheral solution of 10 parts of 3-mercaptobenzoic acid. The dibenzoic acid-3:3′-tetrasulfide which separates is isolated as described under (a) above and is purified by re-crystallization from amyl alcohol. It sinters at 185° C. and melts at 188° C. Its color and chemical behaviour are similar to those of the trisulfide. It is somewhat more soluble in ether than the trisulfide.

Example 2

Di-benzoic acid-ethylester-3:3′-polysulfides (a). *Trisulfide.*—12 parts of 3-mercaptobenzoic acid-methyl ester (boiling point 137° C. at 11 mm. pressure) are dissolved in about the same volume of petroleum ether and the whole is gradually mixed, while cooling, with 5 parts of sulfur dichloride dissolved in petroleum ether. The trisulfide separates at first in the form of an oil which when rubbed in the cold becomes crystalline, forming yellowish-white needles which melt at 34–36° C. It is easily soluble in most organic solvents, but somewhat sparingly soluble in petroleum ether. It dissolves comparatively well in olive oil.

(b). *Tetrasulfide.*—12.5 parts of 3-mercaptobenzoic acid-ethylester are mixed, while cooling, in petroleum ether solution which 6 parts of sulfur monochloride dissolved in petroleum ether. The tetrasulfide separates in the form of a yellow oil which is viscous when cold. It has properties of solubility resembling those of the trisulfide.

Example 3

Di-salicylic acid-5:5′ polysulfides (a). *Trisulfide.*—25 parts of 5-mercaptosalicylic acid (Soc. 1922, vol. 121, page 2555) are dissolved in dry chloroform and the solution is mixed, while cooling with one of 8 parts of sulfur dichloride in chloroform. There separates immediately a yellow precipitate and to complete the separation there is added an equal volume of petroleum ether. By mixing a hot alcoholic solution of this product with boiling water the trisulfide is obtained in the form of beautiful yellow laminæ which melt at 224–225° C. It is soluble in alcohol, ether, ethyl acetate, glacial acetic acid, but very sparingly soluble in chloroform and benzene. In dilute sodium carbonate and bicarbonate solution it dissolves at first clearly but the solution becomes turbid after a short time owing to separation of sulfur. Caustic soda lye decomposes it immediately. It forms an acetyl-derivative which melts at 146° C.

(b) *Tetrasulfide.*—In analogous manner by substituting sulfur monochloride for the sulfur dichloride the disalicylic acid-5:5′-tetrasulfide may be made from 5-mercaptsalicylic acid. When recrystallized from ethyl alcohol the compound forms bright yellow lustrous needles, melting at 228–229° C. It behaves chemically like the trisulfide, from which, however, it is distinguished by its more sparing solubility. In ether it is practically insoluble but more freely soluble in hot amyl alcohol, ethyl alcohol, glacial acetic acid and ethyl acetate.

Example 4

Di-salicylic acid ester-5:5′-polysulfides (a). *Trisulfide.*—10 parts of 5-mercaptosalicylic acid ester (melting point 32° C; boiling point 275° C.) are dissolved in anhydrous ether and the solution is mixed gradually while cooling with 2.8 parts of sulfur dichloride. The trisulfide thus obtained is precipitated by addition of petroleum ether, while cooling. For purification it is dissolved in ether and the solution is mixed hot with petroleum ether. It forms slender canary yellow needles of melting point 77–78° C. It is freely soluble in most organic solvents but insoluble in sodium carbonate solution. It is decomposed by caustic soda solution.

The same compound may be obtained by esterifying the disalicylic acid-5:5′-trisulfide described in Example 3ª, for example the trisulfide may be added to absolute alcohol containing about 20 per cent HCl and the whole boiled in a reflux apparatus for several hours. The ester formed is then precipitated by means of water, dissolved in ether and shaken with sodium bicarbonate solution to separate the unchanged trisulfide. After drying and evaporating the ether the ester remains in the form of a strong yellow crystalline mass which can be purified as described above.

(b). *Tetrasulfide.*—In analogous manner by substituting sulfur monochloride for the sulfur dichloride, there may be obtained, according to one or other of the methods described in *a* above, the di-salicylic acid-ethyl ester-5′:5′-tetrasulfide. It forms beautiful pale yellow needles of melting point 73–74° C. Its chemical behaviour corresponds with that of the trisulfide but the solubility is somewhat greater.

The tri- and tetrasulfide esters described in Example 2 may also be made by subsequent esterification of the corresponding carboxylic acids described in Example 1, the procedure being analogous to that described in Example 4ª.

Analogously to the methods described in the foregoing examples the following tri- and tetrasulfides can be obtained:—

| Trisulfides | Melting point | Properties |
| --- | --- | --- |
| Di-benzoic acid-2:2'-trisulfide. | 302–304° C. | Pale yellowish powder sparingly soluble in organic solvents. |
| Di-benzoic acid-ethyl-ester-2:2'-trisulfide. | 108–110° C. | Fine white needles, freely soluble in benzene, sparingly soluble in absolute alcohol. |
| Di-benzoic acid-ethyl-ester-4:4'-trisulfide. | 50–52° C. | Pale greenish yellow crystals, re-crystalized from petroleum ether + benzene. |
| Di-salicylic acid-allyl-ester-5:5'-trisulfide. | ------------- | Yellowish oil, somewhat more sparingly soluble than the ethyl derivative (Example 4ª). |
| Di-benzoic acid-2:2'-tetrasulfide. | 296–298° C. | Yellowish powder, scarcely soluble in organic solvents. |
| Di-benzoic acid-4:4'-tetrasulfide. | 293–295° C. | Yellow crystals scarcely soluble in organic solvents. |
| Di-salicylic acid-allyl-ester-5:5'-tetrasulfide. | ------------- | Yellow oil somewhat more sparingly soluble than the ethyl derivative (Example 4ᵇ). |

What I claim is:—

1. Process for the manufacture of polysulfides of aromatic compounds containing a chain of more than two sulfur atoms by treating compounds of the formula

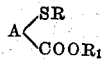

wherein A = an aryl radical which may be still further substituted, R = H or its equivalent of a metal, $R_1$ = H or a monovalent hydrocarbon radical, with sulfur halides.

2. Process for the manufacture of polysulfides of aromatic compounds containing a chain of more than two sulfur atoms by treating compounds of the formula

wherein A = an aryl radical which may be still further substituted, R = H or its equivalent of a metal, with sulfur halides.

3. Process for the manufacture of polysulfides of aromatic compounds containing a chain of more than two sulfur atoms by treating compounds of the formula

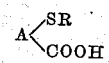

wherein A = an aryl radical which may be still further substituted, R = H or its equivalent of a metal, with sulfur halides and transforming the free polysulfid carboxylic acids thus obtained into their esters.

4. Process for the manufacture of polysulfides of aromatic compounds containing a chain of more than two sulfur atoms by treating compounds of the formula

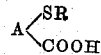

wherein A = an aryl radical which may be still further substituted. R = H or its equivalent of a metal, in any sequence with sulfur halides and esterifying agents.

5. As new products the polysulfides of the formula

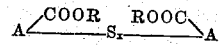

wherein A = an aryl radical which may be still further substituted, $x$ = a whole number higher than two, R = H or a monovalent hydrocarbon radical.

6. As new products the polysulfides of the formula

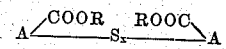

wherein A = an aryl radical which may be still further substituted, $x$ = a whole number higher than two, R = alkyl.

In witness whereof I have hereunto signed my name this 7th day of May, 1928.

ROBERT EDER.